(12) United States Patent
Abu-Taha

(10) Patent No.: US 6,826,449 B1
(45) Date of Patent: Nov. 30, 2004

(54) METHOD FOR PRODUCING NATURAL MOTIONS

(76) Inventor: Ali F. Abu-Taha, 3321 Stone Heather Ct., Herndon, VA (US) 20171-4021

(*) Notice: Subject to any disclaimer, the term of this patent is extended or adjusted under 35 U.S.C. 154(b) by 0 days.

(21) Appl. No.: 09/000,791

(22) Filed: Dec. 30, 1997

(51) Int. Cl.$^7$ .............................................. G06F 19/00
(52) U.S. Cl. ......................... 700/245; 700/38; 700/79; 700/88; 700/246; 700/262; 475/143; 446/3
(58) Field of Search ........................... 700/245, 79, 88, 700/246, 38, 7, 262, 187, 189, 249, 252, 192, 180, 181; 475/149, 162, 178, 179, 904; 446/3

(56) References Cited

U.S. PATENT DOCUMENTS

| | | | | |
|---|---|---|---|---|
| 5,082,465 A | * | 1/1992 | Wine .............................. | 440/37 |
| 5,088,949 A | * | 2/1992 | Atkinson et al. ............... | 446/3 |
| 5,199,920 A | * | 4/1993 | Christen ....................... | 446/419 |
| RE35,375 E | * | 11/1996 | Park ............................ | 466/353 |
| 5,679,047 A | * | 10/1997 | Engel ............................. | 446/3 |
| 5,758,734 A | * | 6/1998 | Hong et al. ................... | 180/8.1 |
| 5,761,940 A | * | 6/1998 | Moore, Jr. et al. ............ | 72/19.4 |
| 5,822,207 A | * | 10/1998 | Hazama et al. ................ | 700/97 |
| 5,845,540 A | * | 12/1998 | Rosheim ................... | 74/490.05 |
| 5,969,973 A | * | 10/1999 | Bourne et al. ............... | 700/165 |
| 5,974,366 A | * | 10/1999 | Kawai et al. ................ | 702/150 |
| 5,982,389 A | * | 11/1999 | Guenter et al. .............. | 345/474 |
| 5,987,958 A | * | 11/1999 | Moore, Jr. et al. ............ | 72/422 |
| 6,131,848 A | * | 10/2000 | Crow ............................. | 244/2 |

FOREIGN PATENT DOCUMENTS

| | | | |
|---|---|---|---|
| EP | 0 388 246 | * | 9/1990 |
| FR | 2 358 174 | * | 2/1978 |

OTHER PUBLICATIONS

Yakovleff et al., Obstacle Avoidance and Motion–Induced Navigation, 1995, IEEE, pp. 384–393.*

(List continued on next page.)

Primary Examiner—Thomas G. Black
Assistant Examiner—McDieunel Marc

(57) ABSTRACT

A method to produce natural motions, or self-motion, of animate or inanimate bodies or their parts by the application of pulses at two or more locations on the surface, or inside, of the bodies or their parts. Here, energy is converted into motion in one step. Turn on the pulses, and motion results instantly. The mechanism can emulate living motions, and as living motions can take on infinite gaits and forms, so can the mechanism produce infinite forms of motion. Smooth, repeatable, controllable or random motions can be induced. Just as living muscles convert the pulses from the nervous system into natural motion in one step, so will the mechanism convert artificially generated pulse-trains into motion in one step. The dynamic coupling or modulation of waves which travel within a body, and which are caused by artificially generated pulse-trains, produces the desired motions in directions perpendicular to the plane of the pulses. Changing the number of pulse-trains, the frequency and/or the amplitude of the pulses, or other parameters, can vary the speed, gait or form of the motion induced by the pulsing method. The moving bodies can be made to turn sideways, at 90 degrees, or at any other angle.

1 Claim, 3 Drawing Sheets

OTHER PUBLICATIONS

Arakawa et al., Naural Motion Trajectory Generation of Biped Locomotion Robit using Genetic Algorithm through Energy Opitmization, IEEE, pp. 1495–1500, 1996.*

Fukuda et al., Stabilization Control of Biped Locomotion Robot based Learning with GAs having Self–adaptive Mutation and Rcurrent Neural Networks, IEEE, pp. 217–222, 1997.*

Hutchins, R.M., "*Great Books of the Western World,*" Encyclopedia Britanica, Inc., Chicago, 1952. vol. 8, "*Aristotle: I,*" pp. 659, 664.

*Ibid,* "*Aristotle: II,*" vol. 9, pp. 235–237.

*Ibid,* "*Newton–Huygens,*" vol. 34, p. 372.

*Ibid,* "*Locke–Berkeley–Hume,*" vol. 35, pp. 179, 209, 475–476.

*Ibid,* "*The Great Ideas,*" vol. I, p. 161 and vol. II, p. 98.

Rosenweig, M.R. et al., "*Biological Psychology,*" 1996, Sunderland, Mass., pp. 143–144, 169,373.

* cited by examiner

METHOD FOR PRODUCING NATURAL MOTIONS

BACKGROUND OF THE INVENTION

1. Field of the Invention

The present invention relates to a mechanism to produce natural motions, or self-motion, of animate and inanimate bodies or of their parts. The mechanism produces motion by coupling, or modulating, mechanical pulses that are generated on the surface, or inside, of the bodies.

2. Background Art

Self-motion denotes the motions produced from within the moving body. The specific mechanical mechanism responsible for self-motion has not been identified before. Historically, Aristotle attributed the natural motions, or self-motion, to "soul," Sir Isaac Newton attributed such motions to a "most subtle spirit," and John Locke, David Hume and others suggested that the mechanism might never be discovered. The inventor has conducted extensive research and many tests to discover the mechanical mechanism responsible for natural motions, or self-motion. The present invention shows how to produce natural motions on horizontal surfaces and up or down inclined surfaces by the application of mechanical pulses to bodies as described herein. In the prior art, the wheel has been the primary mechanism for motion, requiring the use of gears, clutches, shafts, cams, linkages and other mechanical components to produce motion. By contrast, living bodies do not use wheels for motion. Just as living muscles convert the pulses from the nervous system into motion in one step, so the mechanical mechanism of this invention converts artificially generated mechanical pulses into motion in one step.

SUMMARY OF THE INVENTION

It is the object of the present invention to provide a novel and an unobvious method by which animate or inanimate bodies or their parts can be made to move with different speeds, gaits and forms by applying mechanical pulses on the surface of, or within, the body. In a typical embodiment of the invention, mechanical pulses can be induced by attaching one, two or more motors on the surface, or inside, of the body; by attaching unbalanced masses to the motors' shafts, and by rotating the unbalanced masses so as to pulse the body at the motors' locations. The dynamic coupling or modulation of the oscillatory waves which travel within the body, and which are caused by the pulses, produces the desired motions. Here, energy is converted into motion in one step, i.e., turn on the pulses, and motion results instantly

BEST MODE FOR CARRYING OUT THE INVENTION

Figure 1:
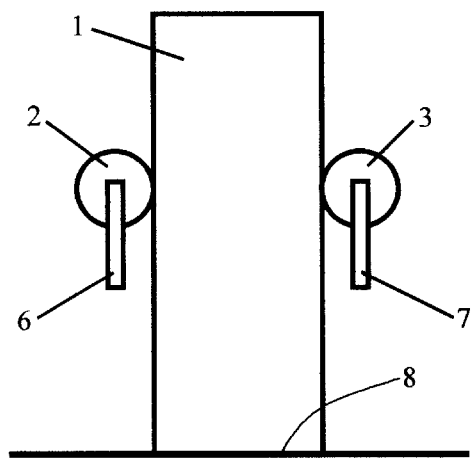
FIG. 1 is a front view showing the general arrangement to produce linear motion by the method of this invention.

Referring to FIG. 1, any body 1 standing on its base 8, or standing on one, two, or more legs or supports can be induced to move by subjecting the body to one, two or more pulse trains. One mode for carrying out the invention is to produce controlled linear motion of the body.

Figure 2:
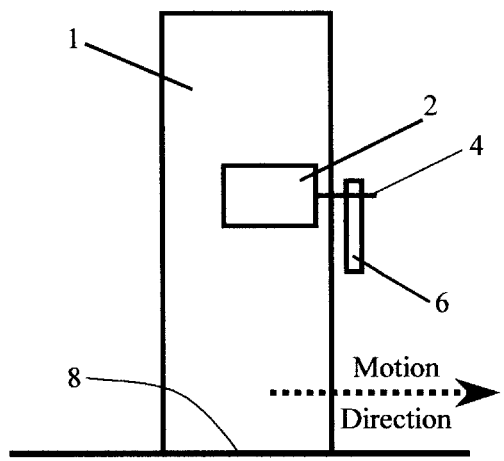
FIG. 2 is a side view.
Figure 3:
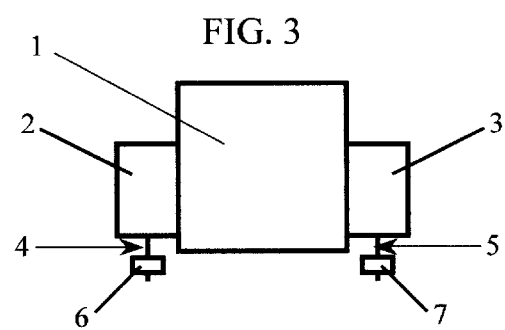
FIG. 3 is a top view

Referring to FIG. 1, mechanical pulses can be produced by rotating unbalanced masses 6 and 7 mounted on the shafts 4 and 5 of the two motors 2 and 3. The two motors 2 and 3 are fixed firmly and symmetrically on the sides of the body 1. When the unbalanced mass 6 is rotated counterclockwise (CCW) and the unbalanced mass 7 is rotated clockwise (CW), the resulting direction of motion is perpendicular to the plane of rotation of the unbalanced masses, as shown in FIG. 2. The body 1 can be made to turn to the right or to the left by deactivating one of the motors 2 or 3. Referring to FIG. 3, when only motor 2 is active, the body 1 turns counterclockwise (or left turn) and when only motor 3 is active, the body 1 turns clockwise (or right turn). Alternatively, the body can be made to turn sideways, at 90 degrees, or at any other angle by turning the motion mechanism (i.e., the two motors 2 and 3), or by adding a second mechanism (i.e., two motors with unbalanced masses), to act in the desired direction.

The two motors 2 and 3 can be mounted on a harness, belt or other independent structures, which can be attached to body 1 to cause the latter to move. The same belt can then be reused to move other similar bodies. The sense of rotation of the unbalanced masses and the direction of motion will be the same as described for the fixed motors above.

The speed, gait and form of the induced motion can be changed in several ways: (1) By changing the number of sources of the mechanical pulses (in this case, by changing the number of motors); (2) by changing the frequency of the pulses (in this case, by increasing or decreasing the power input to either, or both, motors); (3) by changing the amplitude of the pulses (in this case, by changing the rotation inertia of the rotating unbalanced elements, for example, by changing the mass or geometry of the rotating unbalanced elements); (4) by changing the phase of rotation of the pulse oscillations; (5) by changing the material of the moved-body itself or of its parts; (6) by changing the material of the surface on which the body moves; (7) by changing the material of the body in contact with the motion surface, (8) by changing the sense of rotation of the unbalanced elements, i.e., clockwise or counterclockwise; or (9) by connecting the pulses induced in one part of the body to other location(s) on the body.

Figure 4:
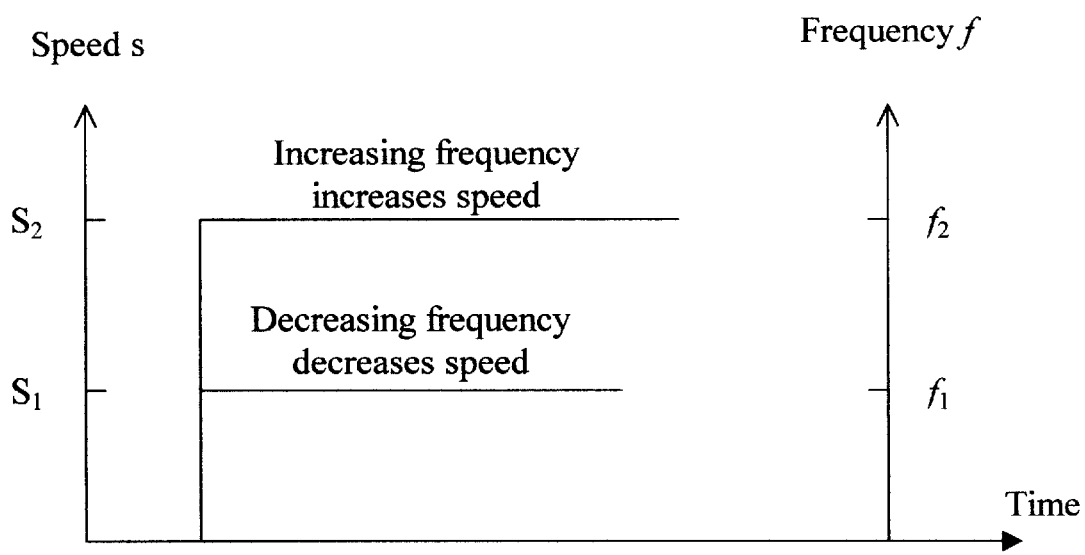
FIG. 4 is a plot showing the dependence of the speed of the body on the frequencies of the pulses. In particular, the greater the frequency, the greater the speed.
Figure 5:
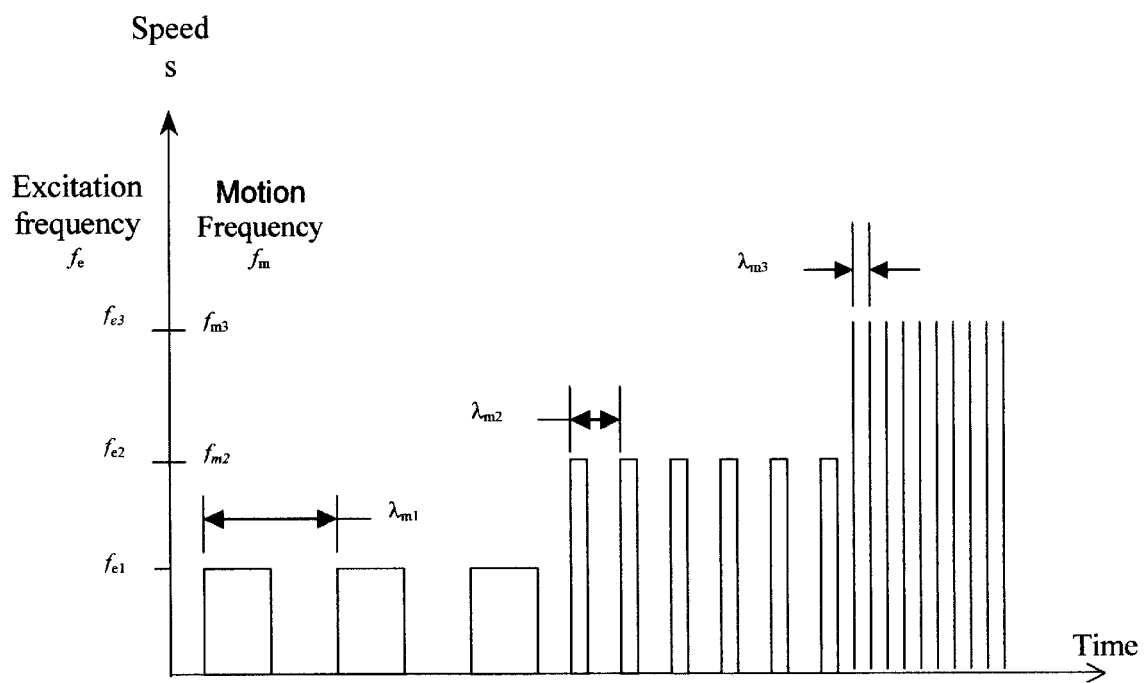
FIG. 5 is a plot showing the stepped-motion that can be produced at different frequencies of pulses (denoted by $f_e$).

To produce repeatable motion, fix the above parameters. To produce linear motion, place the motors symmetrically on the sides, on the top, or inside of the body. Referring to FIG. 4, to increase or decrease the speed, increase or decrease the frequency of the pulses. Referring to FIG. 5, to produce stepped-motion, operate the motors at different rotational speeds to induce different pulse rates. To produce smoother motion, increase the frequency of the pulses or add more sources of vibration to the body. To produce random motion, use malleable or elastic bodies.

Those skilled in the arts will be able to use the mechanism of this invention in diverse ways to produce diverse forms of motion in diverse bodies. As a general guide, the ratio of the mass of the moved body to the mass of the rotating unbalanced mass can take on many values; and practitioners can use any ratio between 10:1 to 1000:1, or smaller or larger ratios, depending on the frequencies in use and the other parameters described above.

In the Videotape

The mechanism of this invention emulates living motions, and as living motions can take on infinite gaits and forms, so can the mechanism of this invention produce infinite forms of motion. Videotape showing sample motions that can be produced by this invention is submitted with this application. The videotape shows the motions produced in more than 50 models and toys, primarily using the two-symmetric-motors configuration or the Best Mode for Carrying Out the Invention, described above. Videotape(s) and working motion models are also available for review by practitioners who are interested in this invention.

What I claim is:

1. A method for moving bodies comprising the step of:

applying a plurality of pulse-trains, which are produced by one, two, or more sources of mechanical pulses, to the bodies; whereby dynamic coupling of waves produced by said pulses in said bodies induces different motions depending on the frequency, amplitude, phase and locations of said pulses and where said motions are in directions perpendicular to the planes of said pulses.

* * * * *